United States Patent
Shimizu

(10) Patent No.: US 8,045,243 B2
(45) Date of Patent: Oct. 25, 2011

(54) METHOD, APPARATUS, AND PROGRAM FOR GENERATING SYNTHESIZED IMAGES

(75) Inventor: Ryo Shimizu, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1440 days.

(21) Appl. No.: 11/521,343

(22) Filed: Sep. 15, 2006

(65) Prior Publication Data
US 2007/0064277 A1   Mar. 22, 2007

(30) Foreign Application Priority Data

Sep. 16, 2005   (JP) .................. 2005-270069

(51) Int. Cl.
*H04N 1/46* (2006.01)
(52) U.S. Cl. .......... 358/540; 358/537; 358/520; 358/1.9
(58) Field of Classification Search ............ 358/540, 358/537, 520
See application file for complete search history.

(56) References Cited

U.S. PATENT DOCUMENTS

| 5,297,058 A * | 3/1994 | Samworth ............. 382/167 |
| 5,315,416 A * | 5/1994 | Taniuchi et al. ........... 358/537 |
| 2004/0227978 A1 * | 11/2004 | Enomoto .................. 358/3.26 |
| 2005/0068587 A1 * | 3/2005 | Hayaishi .................... 358/3.01 |
| 2006/0187477 A1 * | 8/2006 | Maki et al. .................. 358/1.9 |

FOREIGN PATENT DOCUMENTS

| JP | 11-355584 A | 12/1999 |
| JP | 2001-283232 A | 10/2001 |

* cited by examiner

*Primary Examiner* — Twyler Haskins
*Assistant Examiner* — Michael Burleson
(74) *Attorney, Agent, or Firm* — Birch, Stewart, Kolasch and Birch, LLP

(57) ABSTRACT

Synthesized images having unpredictable appearances are obtained when generating the synthesized images by arranging a plurality of images in predetermined formats. A monotone image generating section generates a plurality of monotone images, by converting each of a plurality of images into monotone images of random hues. A synthesizing section arranges the plurality of monotone images in the predetermined layout, to generate the synthesized image.

14 Claims, 13 Drawing Sheets

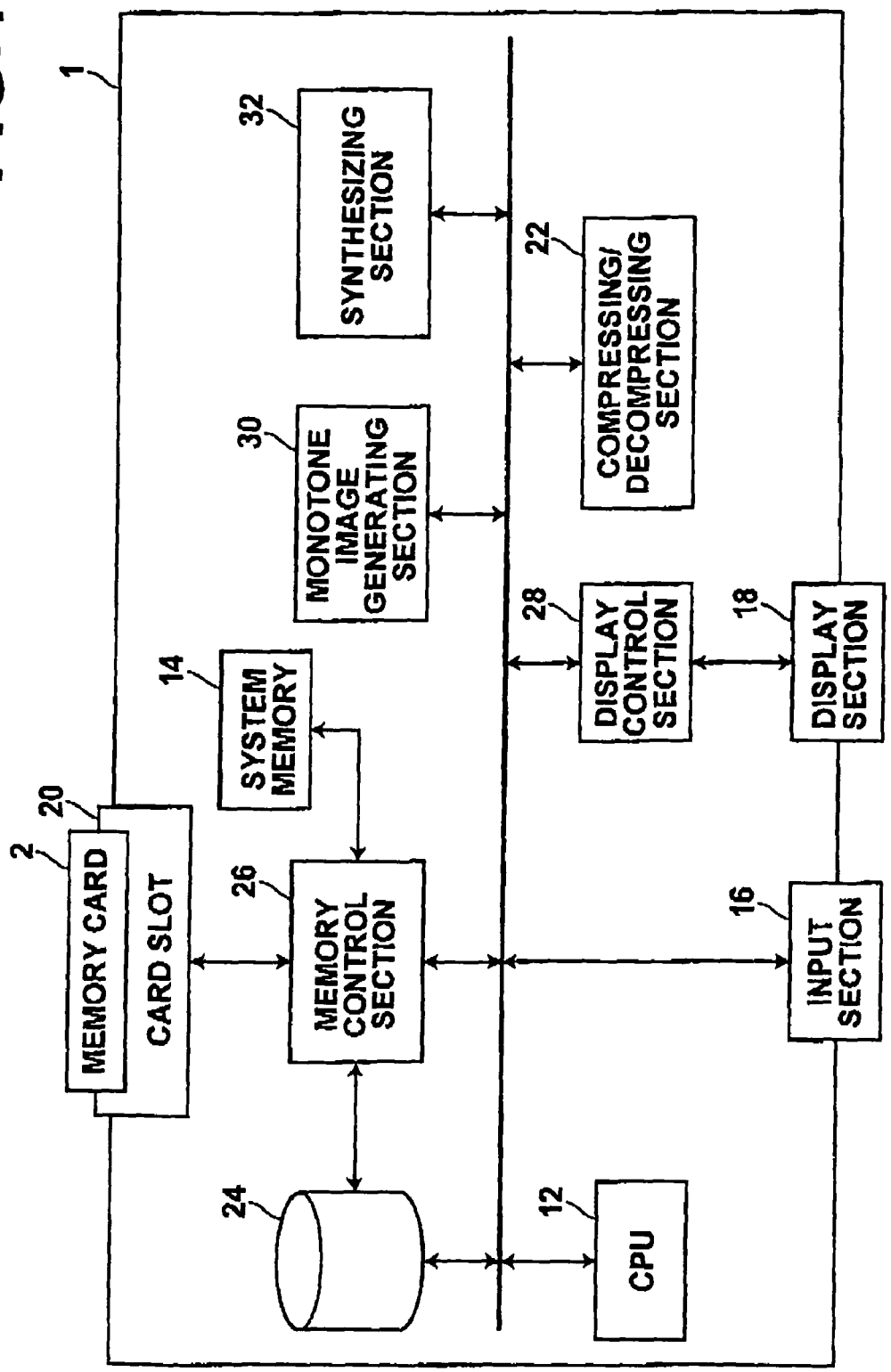

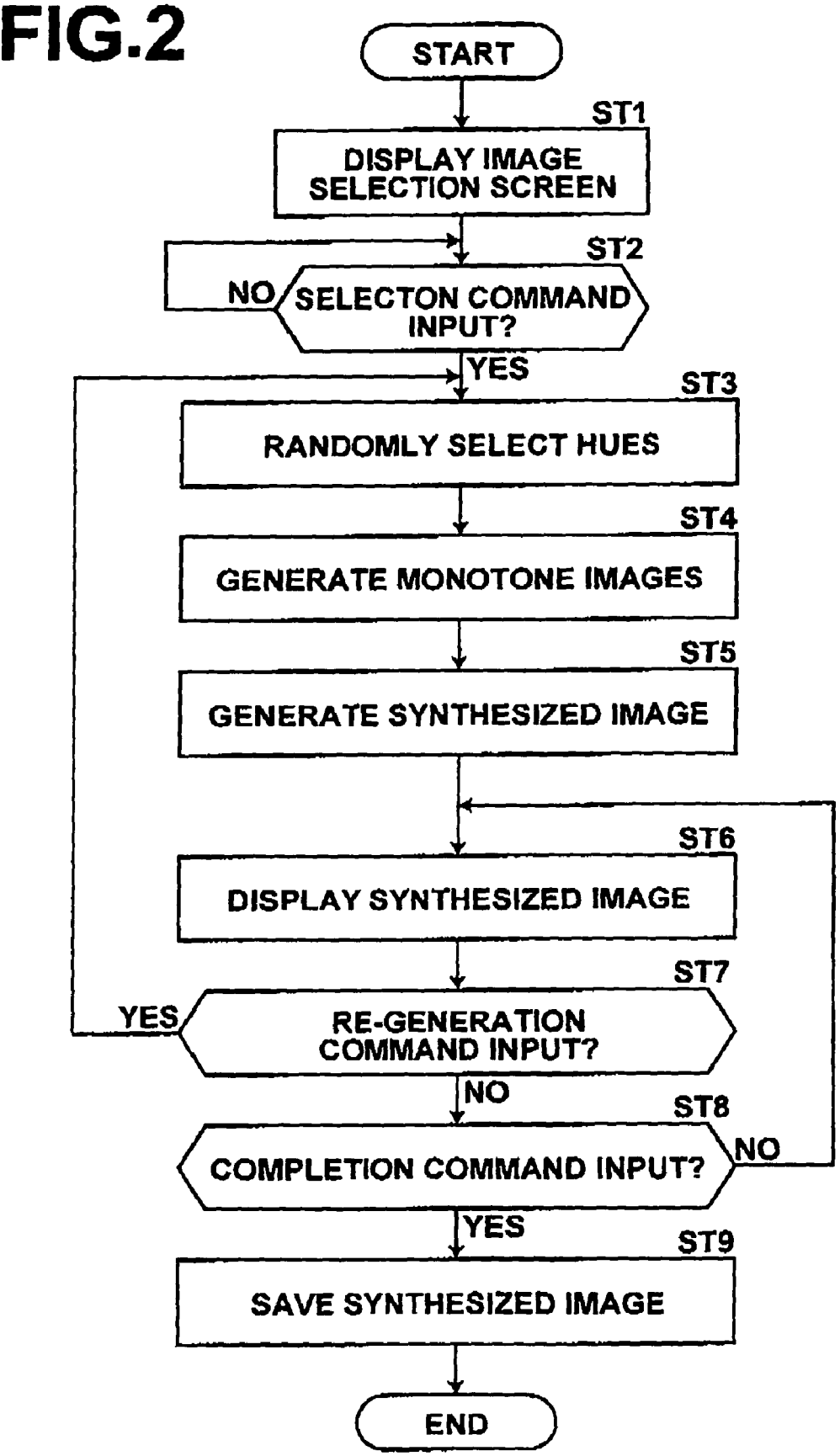

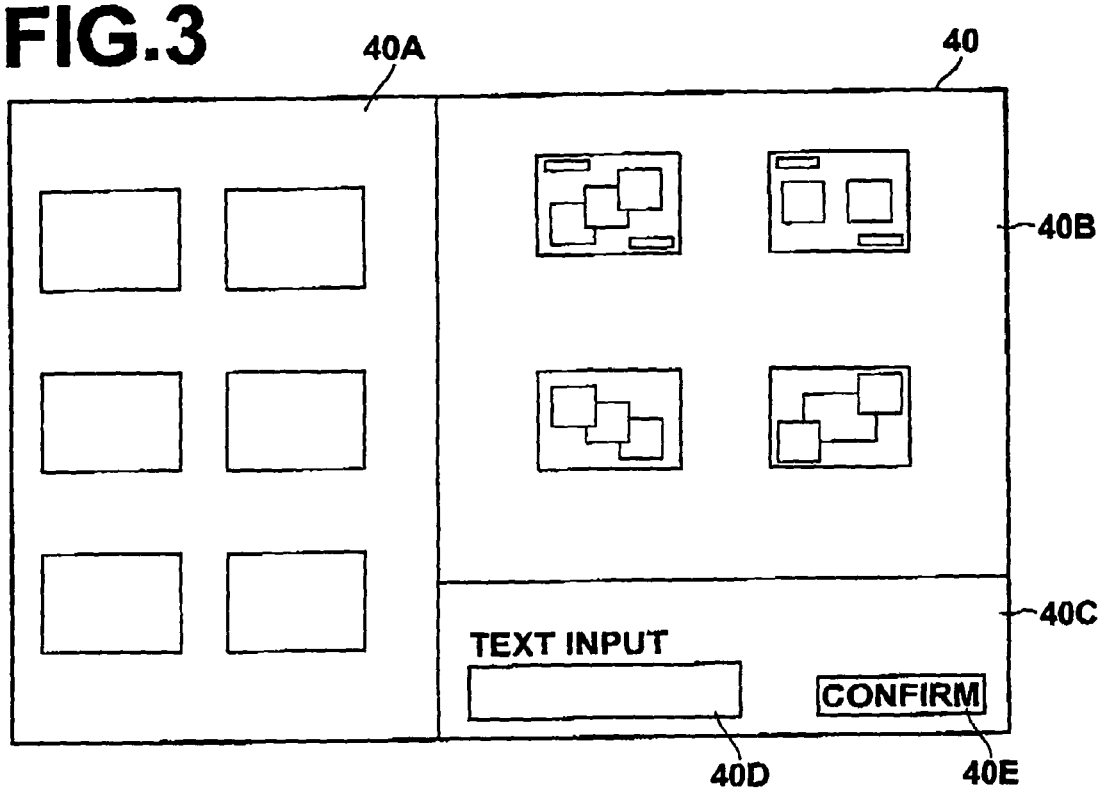
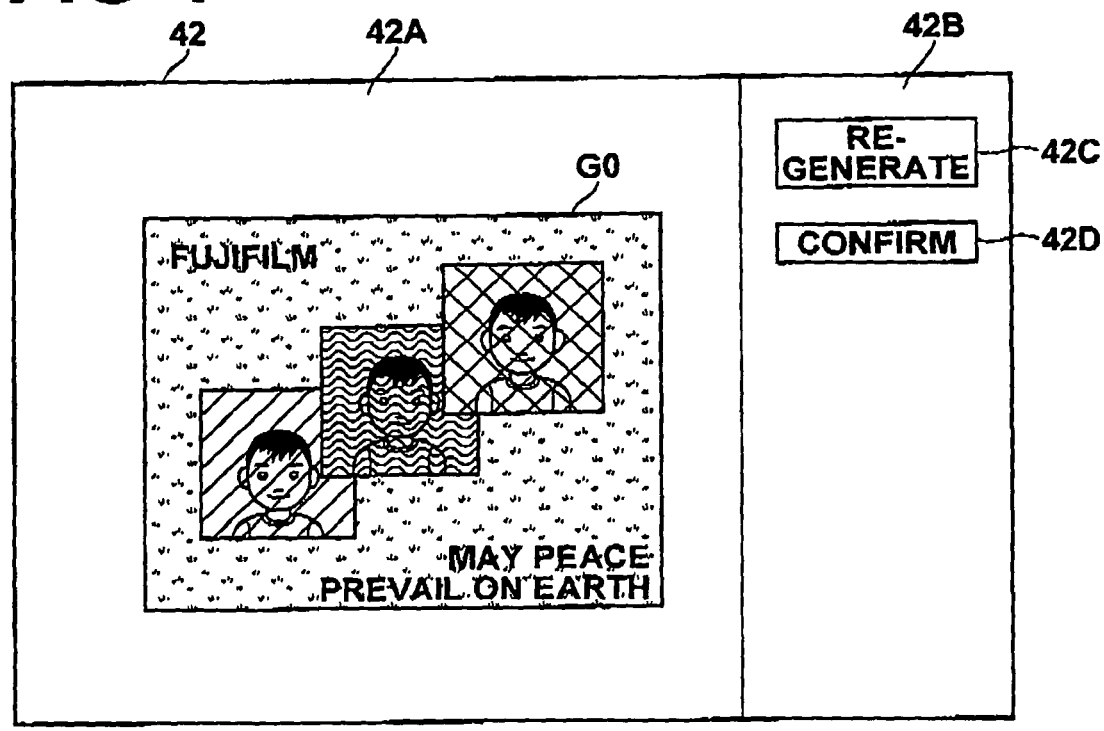

| RGB | CORRESPONDING HUES |
|---|---|
| (0-29,0-29,0-29) | (0-29,90-119,0-29) · · · · · |
| (30-59,0-29,0-29) | (0-29,90-119,30-59) · · · · · |
| (60-89,0-29,0-29) | (0-29,90-119,60-89) · · · · · |
| ⋮ | ⋮ |

METHOD, APPARATUS, AND PROGRAM FOR GENERATING SYNTHESIZED IMAGES

BACKGROUND OF THE INVENTION

1. Field of the Invention

The present invention relates to a method, an apparatus, and a program for synthesizing a plurality of images into a single synthesized image in a predetermined layout.

2. Description of the Related Art

Synthesized images are generated by arranging a plurality of images in predetermined layouts. For example, Japanese Unexamined Patent Publication No. 2001-283232 discloses a method for generating synthesized images. In this method, a layout file is selected from among a plurality of layout files that define a variety of layouts. Then, images are arranged and processed, based on a processing file that defines the contents of the layout defined by the selected layout file, to generate a synthesized image. In this method, the processing file is randomly selected. Therefore, synthesized images having different layouts can be obtained by the processes which are administered, even if the same images are synthesized.

Japanese Unexamined Patent Publication No. 11 (1999)-355584 discloses a processing method for images. In this method, images are converted into monotone images according to a specified color balance, to generate monotone images having the specified color balance. It is possible to generate synthesized images by laying out a plurality of these monotone images in predetermined layouts.

However, in the method disclosed in Japanese Unexamined Patent Publication No. 11 (1999)-355584, the monotone images are those that have the specified color balance. Therefore, synthesized images generated employing these monotone images are predictable, and often not aesthetically pleasing.

SUMMARY OF THE INVENTION

The present invention has been developed in view of the foregoing circumstances. It is an object of the present invention to obtain synthesized images having unpredictable appearances when generating the synthesized images by arranging a plurality of images in predetermined formats.

A first synthesized image generating apparatus of the present invention is a synthesized image generating apparatus for generating a synthesized image by arranging a plurality of images including a background image in a predetermined layout, comprising:

monotone image generating means, for generating a plurality of monotone images, by converting the plurality of images into monotone images of random hues; and synthesizing means, for arranging the plurality of monotone images in the predetermined layout, to generate the synthesized image.

The first synthesized image generating apparatus of the present invention may further comprise:

color correspondence memory means, for recording correspondent relationships between a plurality of colors and corresponding hues, which are set in advance;

display means, for displaying the synthesized image;
input means, for receiving various types of input; and
control means, for controlling the monotone image generating means and the synthesizing means to receive a command input to the input means that confirms the hue in at least one of the images included in the synthesized image, generate new monotone images of the images except the at least one image by converting the images into monotone images of random hues using only the hues corresponding to the confirmed colors, and re-generate the synthesized image by arranging the new monotone images in the predetermined layout along with the at least one monotone image in which the hue was confirmed.

In this case, a configuration may be adopted, wherein:
the control means controls the monotone image generating means and the synthesizing means to re-generate the monotone images based on a command input to the input means, re-generate a synthesized image by arranging the re-generated monotone images, and re-display the synthesized image at the display means.

A second synthesized image generating apparatus of the present invention is a synthesized image generating apparatus for generating a synthesized image by arranging at least three images including a background image in a predetermined layout, comprising:

monotone image generating means, for generating a plurality of monotone images, by converting two of the at least three images into monotone images of random hues, and by converting the other images into monotone images of intermediate hues between the two random hues; and synthesizing means, for arranging the plurality of monotone images in the predetermined layout, to generate the synthesized image.

The second synthesized image generating apparatus of the present invention may further comprise:

display means, for displaying the synthesized image;
input means, for receiving various types of input; and
control means, for controlling the monotone image generating means and the synthesizing means to re-generate the monotone images based on a command input to the input means, re-generate a synthesized image by arranging the re-generated monotone images, and re-display the synthesized image at the display means.

The first and second synthesized image generating apparatuses of the present invention may be configured such that:
the synthesizing means generates the synthesized image such that the synthesized image includes specified text.

A first synthesized image generating method of the present invention is a synthesized image generating method for generating a synthesized image by arranging a plurality of images including a background image in a predetermined layout, comprising the steps of;

generating a plurality of monotone images, by converting the plurality of images into monotone images of random hues; and arranging the plurality of monotone images in the predetermined layout, to generate the synthesized image.

The first synthesized image generating method of the present invention may further comprise the steps of:

displaying the synthesized image;
receiving a command that confirms the hue in at least one of the images included in the displayed synthesized image;

generating new monotone images of the images except the at least one image by converting the images into monotone images of random hues using only hues corresponding to the confirmed colors, said correspondence between a plurality of colors and corresponding hues being set in advance; and re-generating the synthesized image by arranging the new monotone images in the predetermined layout along with the at least one monotone image in which the hue was confirmed.

A second synthesized image generating method of the present invention is a synthesized image generating method for generating a synthesized image by arranging at least three images including a background image in a predetermined layout, comprising the steps of:

generating a plurality of monotone images, by converting two of the at least three images into monotone images of random hues, and by converting the other images into monotone images of intermediate hues between the two random hues; and arranging the plurality of monotone images in the predetermined layout, to generate the synthesized image.

Note that the first and second synthesized image generating methods of the present invention may be provided as programs that cause computers to execute the synthesized image generating methods.

Note also that the programs of the present invention may be provided being recorded on computer readable media. Those who are skilled in the art would know that computer readable media are not limited to any specific type of device, and include, but are not limited to: floppy disks. CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

According to the first synthesized image generating apparatus and the first synthesized image generating method of the present invention, a synthesized image is generated, by arranging a plurality of images including a background image in a predetermined layout. First, a plurality of monotone images are generated, by converting the plurality of images into monotone images of random hues. Then, the plurality of monotone images are arranged in the predetermined layout, to generate the synthesized image. Therefore, monotone images of unpredictable color schemes are laid out in the synthesized image. Accordingly, aesthetically interesting synthesized images having unpredictable color schemes can be generated.

The synthesized image may be displayed; the monotone images may be re-generated based on an input re-generation command; a synthesized image may be re-generated by arranging the re-generated monotone images; and the synthesized image may be re-displayed. In this case, synthesized images can be re-generated until one is obtained having a desired color scheme.

The synthesized image may be displayed; a command that confirms the hue in at least one of the images included in the displayed synthesized image may be received; new monotone images may be generated of the images except the at least one image by converting the images into monotone images of random hues using only hues corresponding to the confirmed colors, said correspondence between a plurality of colors and corresponding hues being set in advance; and the synthesized image may be re-generated by arranging the new monotone images in the predetermined layout along with the at least one monotone image in which the hue was confirmed. In this case, synthesized images having more artistic color schemes may be generated.

In this case as well, the synthesized image may be displayed; the monotone images may be re-generated based on an input re-generation command; a synthesized image may be re-generated by arranging the re-generated monotone images; and the synthesized image may be re-displayed. Thereby, synthesized images can be re-generated until one is obtained having a desired color scheme.

According to the second synthesized image generating apparatus and the second synthesized image generating method of the present invention, at least three images including a background image are arranged in a predetermined layout. First, a plurality of monotone images are generated, by converting two of the at least three images into monotone images of random hues, and by converting the other images into monotone images of intermediate hues between the two random hues. Then the plurality of monotone images are arranged in the predetermined layout, to generate the synthesized image. Therefore, the resulting synthesized image includes two monotone images of unpredictable hues, and at least one other monotone image, in which the hue of the two images changes gradually. Accordingly, the resulting synthetic image is unpredictable, aesthetically pleasing, and high in artistic value.

The synthesized image may be displayed; the monotone images may be re-generated based on an input re-generation command; a synthesized image may be re-generated by arranging the re-generated monotone images; and the synthesized image may be re-displayed. In this case, synthesized images can be re-generated until one is obtained having a desired color scheme.

BRIEF DESCRIPTION OF THE DRAWINGS

FIG. 1 is a schematic block diagram that illustrates the construction of a synthesized image generating apparatus according to a first embodiment of the present invention.

FIG. 2 is a flow chart that illustrates the process performed by the synthesized image generating apparatus of the first embodiment.

FIG. 3 is a diagram that illustrates an example of an image selection screen.

FIG. 4 is a diagram that illustrates an example of a synthesized image display screen.

BEST MODE FOR CARRYING OUT THE INVENTION

Figure 5:
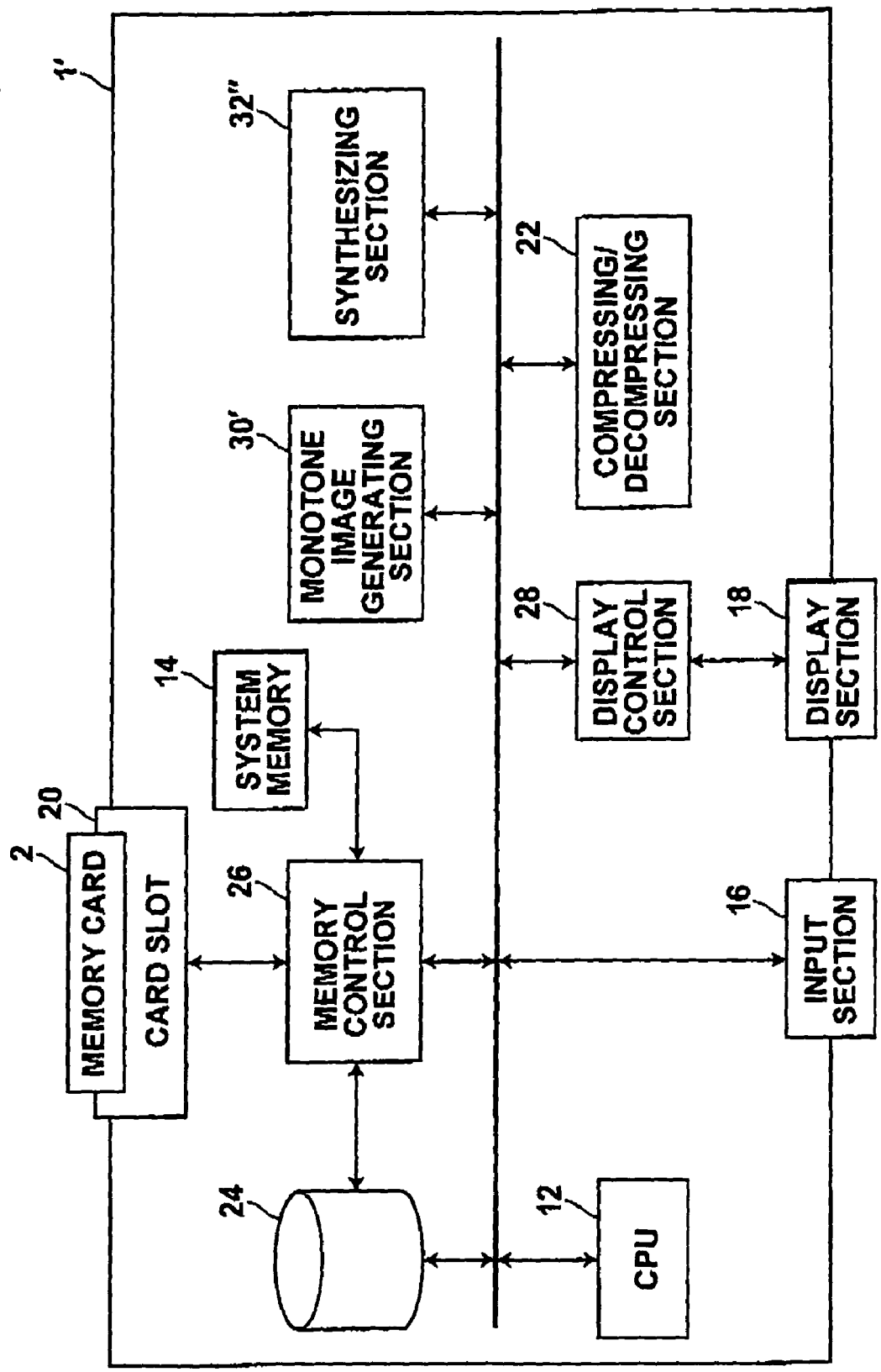
FIG. 5 is a schematic block diagram that illustrates the construction of a synthesized image generating apparatus according to a second embodiment of the present invention.

Hereinafter, embodiments of the present invention will be described in detail with reference to the attached drawings.

FIG. 1 is a schematic block diagram that illustrates the construction of a synthesized image generating apparatus 1 (hereinafter, simply referred to as "apparatus 1") according to a first embodiment of the present invention. As illustrated in FIG. 1, the apparatus 1 comprises: a CPU 12, for controlling recording, display, and other aspects of image data sets that represent images, as well as the various components of the apparatus 1; a system memory 14 that includes a ROM, in which programs for operating the apparatus 1 and various constants are recorded, and a RAM, which becomes a workspace when the CPU executes processes; an input section 16 constituted by a keyboard and a mouse, for example, for receiving input of commands to the apparatus 1; and a display section 18, constituted by an LCD monitor or the like.

The synthesized image generating apparatus 1 further comprises: a card slot 20, for reading image data sets out of a memory card 2 in which image data sets are recorded and for recording image data sets into the memory card 2; a compressing/decompressing section 22, for compressing image data sets in formats such as JPEG and for decompressing compressed image data sets; a hard disk 24, in which image data sets read out from the memory card 2 and programs to be executed by the CPU such as viewer software for viewing images, are recorded; a memory control section 26, for controlling the system memory 14, the card slot 20, and the hard disk 24; and a display control section 28, for controlling display by the display section 18.

Note that in the first embodiment, image data sets representing background images each having a plurality of image insertion regions for defining layouts necessary to generate synthesized images, are stored in the hard disk 24 in addition to the image data sets.

The synthesized image generating apparatus 1 still further comprises: a monotone image generating section 30, for generating monotone images by converting images, which are selected from among the images stored in the hard disk 24, into monotone images; and a synthesizing section 32, for synthesizing the monotone images to generate a synthesized image.

Hereinafter, the functions of the monotone image generating section 30 and the synthesizing section 32 will be described in combination with processes which are performed by the apparatus 1 of the first embodiment.

FIG. 2 is a flow chart that illustrates the process performed by the apparatus 1 of the first embodiment. The CPU 12 initiates processing when a user inputs a command to generate a synthesized image via the input section 16. First, an image selection screen, including thumbnail images of images which are stored in the hard disk 24, is displayed by the display section 18 (step ST1). FIG. 3 illustrates an example of the image selection screen. As illustrated in FIG. 3, the image selection screen comprises: a thumbnail image area 40A, in which thumbnail images of images stored in the hard disk 24 are displayed; a background image area 40B, in which background images are displayed; and an input area 40C, for performing various types of input. A text input box 40D, into which text to be included in synthetic images can be input, and a "CONFIRM" button 40E, for confirming the contents of synthesized images, are displayed in the input area 40C.

The user is enabled to select desired images and background images from the thumbnail image area 40A and the background image area 40B of the image selection screen, by use of the input section 16. Note that here, a case will be described in which a single image is selected. In addition, text to be included in the synthesized image may be input via the text input box 40D.

Next, monitoring is initiated to determine whether the user has clicked the "CONFIRM" button 40E to indicate that they have completed selection of images (step ST2). When the "CONFIRM" button 40E is clicked, the monotone image generating section 30 generates copies of the image selected by the users, the number of copies corresponding to the number of image insertion regions within a selected background image, and randomly selects hues, the number of hues corresponding to the number of copied images plus one for the background image (step ST3). Then, the monotone image generating section 30 converts each of the plurality of images (including the background image) into monotone images according to the randomly selected hues, to generate monotone images (step ST4). For example, in the case that there are four images, and the images have 8 bit gradations within an RGB color space, random hues may be selected for the four images, such as (R, G, B)=(100, 23, 248), (2, 45, 100), (253, 234, 23), and (34, 242, 255). The monotone images are generated according to the selected hues. Note that a monotone image refers to an image in which the density differences of the image are expressed by a single hue.

Thereafter, the synthesizing section 32 inserts the monotone images of the images selected by the user into the monotone image of the background image and arranges the input text, to generate the synthesized image (step ST5). Then, the generated synthesized image is displayed by the display section 18 (step ST6).

FIG. 4 illustrates an example of a synthesized image display screen 42. As illustrated in FIG. 4, the synthesized image display screen 42 comprises: a synthesized image area 42A, in which a synthesized image G0 is displayed; and an input area 42B, for receiving various types of input. A "RE-GENERATE" button 42C, for re-generating a synthesized image, and a "CONFIRM" button 42D, for confirming a displayed synthesized image, are provided in the input area 42B. Note that in the synthesized image G0 displayed in the synthesized image area 42A of FIG. 4, the monotone images are represented by different types of hatching, to indicate that they are monotone images of different hues. In addition, text that reads "FUJIFILM" and "MAY PEACE PREVAIL ON EARTH", which have been input by the user via the text input box 40D, appear in the synthesized image G0.

Note that there are portions within the synthesized image G0 at which the monotone images overlap. In the first embodiment, the monotone images are overwritten at the overlapping portions such that the lower monotone images are not visible through the upper monotone images. Alternatively, the overlapping portions may be processed to be translucent, and the lower monotone images may be visible through the upper monotone images.

Thereafter, it is judged whether a re-generation command has been issued (step ST7). That is, whether the "RE-GENERATE" button 42C has been clicked is monitored. In the case that the judgment in step ST7 is affirmative, the process returns to step ST3, and the steps thereafter are repeated. Thereby, new monotone images of random hues are re-generated, a new synthesized image is re-generated using the new monotone images, and the new synthesized image is displayed in the synthesized image area 42A of the synthesized image display screen 42.

In the case that the result of judgment in step ST7 is negative, it is judged whether a completion command for the synthesized image generating process has been issued (step ST8). That is, whether the "CONFIRM" button 42D has been clicked in judged. In the case that the result of judgment in step ST8 is negative, the process returns to step ST6, and the steps thereafter are repeated. In the case that the result in step ST8 is affirmative, an image data set that represents the confirmed synthesized image is recorded in the hard disk 24 (step ST9), and the process ends.

Note that the synthesized image may be output as a print by a printer (not shown). Alternatively, the synthesized image may be recorded onto the memory card 2, and output as a print by a DPE store, to which the image data set has been transmitted via a network, or by the memory card 2 being brought into the DPE store. As a further alternative, the synthesized image generating apparatus 1 may be incorporated into a print reception terminal installed at a DPE store. In this case, the synthesized image may be directly output as a print at the DPE store.

In the first embodiment, a plurality of monotone images are generated, by converting the plurality of images into monotone images of random hues. Then, the plurality of monotone images are arranged in the layout of the background image, to generate the synthesized image. Therefore, monotone images of unpredictable color schemes are laid out in the synthesized image. Accordingly, aesthetically interesting synthesized images having unpredictable color schemes can be generated.

In addition, the synthesized image is displayed; new monotone images can be generated based on an input re-generation command; a new synthesized image is generated by arranging the newly generated monotone images; and the new synthesized image is re-displayed. Thereby, synthesized images can be re-generated until one is obtained having a desired color scheme.

Next, a second embodiment of the present invention will be described. FIG. 5 is a schematic block diagram that illustrates the construction of a synthesized image generating apparatus 1' (hereinafter, simply referred to as "apparatus 1'") according to the second embodiment of the present invention. Note that structural components of the apparatus 1' of the second embodiment which are the same as those of the apparatus 1 of the first embodiment will be denoted with the same reference numerals, and detailed descriptions thereof will be omitted. The apparatus 1' of the second embodiment differs from the apparatus 1 of the first embodiment in that it comprises a monotone image generating section 30' and a synthesizing section 32' that perform processes different from those performed by the monotone image generating section 30 and the synthesizing section 32.

Hereinafter, the functions of the monotone image generating section 30' and the synthesizing section 32' will be described in combination with processes which are performed by the apparatus 1' of the second embodiment.

Figure 6:
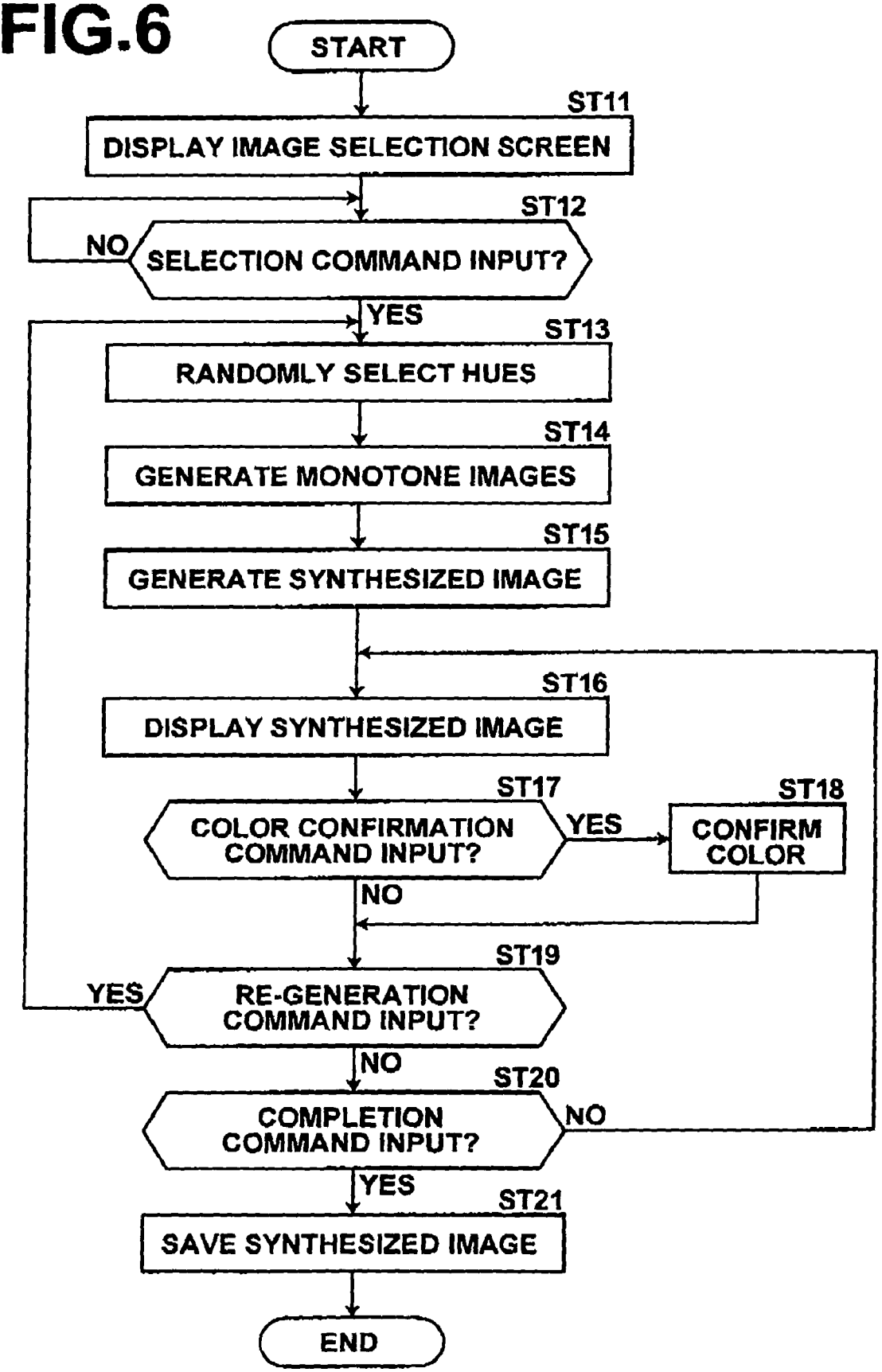
FIG. 6 is a flow chart that illustrates the process performed by the synthesized image generating apparatus of the first embodiment.

FIG. 6 is a flow chart that illustrates the process performed by the apparatus 1' of the second embodiment. The CPU 12 initiates processing when a user inputs a command to generate a synthesized image via the input section 16. First, an image selection screen, including thumbnail images of images which are stored in the hard disk 24, is displayed by the display section 18 (step ST11). Note that the image selection screen of the second embodiment is the same as that of the first embodiment illustrated in FIG. 3. Therefore, a detailed description thereof will be omitted here.

Next, monitoring is initiated to determine whether the user has clicked the "CONFIRM" button 40E to indicate that they have completed selection of images (step ST12). When the "CONFIRM" button 40E is clicked, the monotone image generating section 30' generates copies of the image selected by the users, the number of copies corresponding to the number of image insertion regions within a selected background image, and randomly selects hues, the number of hues corresponding to the number of copied images plus one for the background image (step ST13). Then, the monotone image generating section 30' converts each of the plurality of images (including the background image) into monotone images according to the randomly selected hues, to generate monotone images (step ST14). Thereafter, the synthesizing section 32' inserts the monotone images of the images selected by the user into the monotone image of the background image and arranges the input text, to generate the synthesized image (step ST15). Then, the generated synthesized image is displayed by the display section 18 (step ST16).

Figures 7, 8:
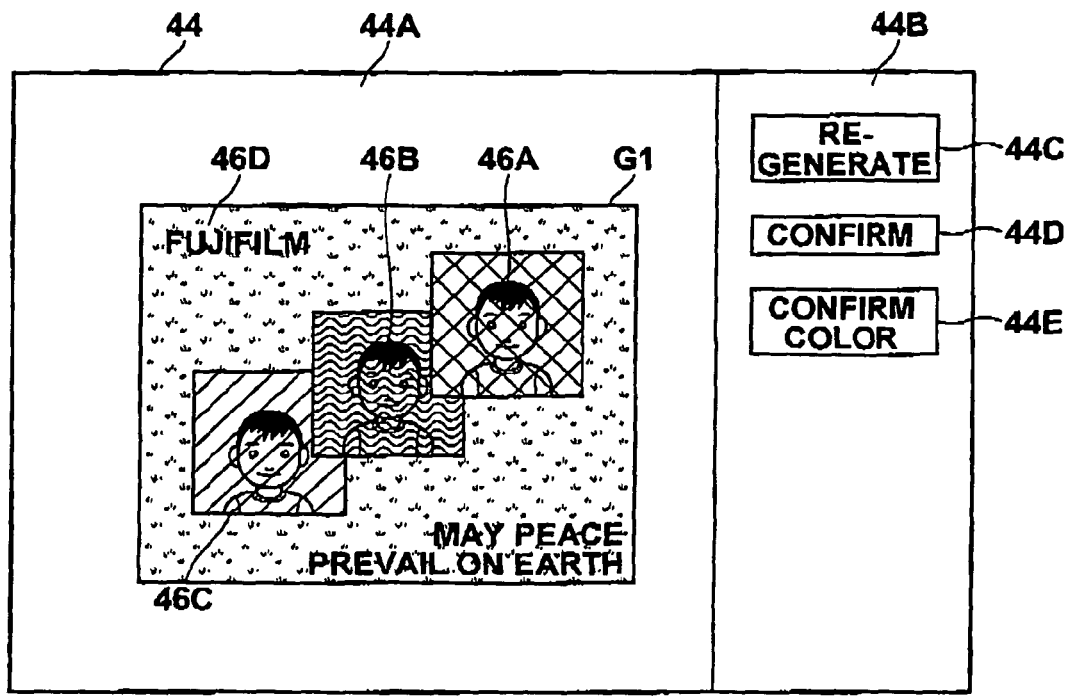
FIG. 7 is a diagram that illustrates an example of a synthesized image display screen of the second embodiment.
FIG. 8 is a diagram that illustrates an example of a color correspondence look up table.

FIG. 7 illustrates an example of a synthesized image display screen 44. As illustrated in FIG. 7, the synthesized image display screen 44 comprises; a synthesized image area 44A, in which a synthesized image G1 is displayed; and an input area 44B, for receiving various types of input. A "RE-GENERATE" button 44C, for re-generating a synthesized image, a "CONFIRM" button 44D, for confirming a displayed synthesized image, and a "CONFIRM HUE" button 44E are provided in the input area 44B. Note that in the synthesized image G0 displayed in the synthesized image area 42A of FIG. 4, the monotone images are represented by different types of hatching, to indicate that they are monotone images of different hues. The synthesized image G1 is constituted by three monotone images 46A through 46C, and a monotone background image 46D.

In the second embodiment, the user is enabled to select at least one monotone image from among the monotone images 46A through 46D, in which a desired hue is included. If the "CONFIRM HUE" button 44E is clicked after at least one of the monotone images is selected, the hue of the at least one selected monotone image is confirmed. In the case that the "RE-GENERATE" button 44C is clicked thereafter, new monotone images are generated for monotone images which are of hues other than the at least one confirmed hue, and a new synthesized image is re-generated.

For this reason, the CPU 12 judges whether the user has issued a color confirmation command (step ST17. That is, the CPU 12 judges whether the user has clicked the "CONFIRM HUE" button 44E after selecting at least one desired monotone image. In the case that the result of judgment in step ST17 is affirmative, the hue of the at least one selected monotone image is confirmed (step ST18). In the case that the result of judgment in step ST17 is negative, the process proceeds to step ST19.

Thereafter, it is judged whether a re-generation command has been issued (step ST19). That is, whether the "RE-GENERATE" button 44C has been clicked is monitored. In the case that the judgment in step ST19 is affirmative, the process returns to step ST13, and the steps thereafter are repeated.

At this time, in the case that the user has confirmed at least one hue of at least one monotone image, new monotone images of random hues are re-generated for monotone images other than the at least one monotone image for which the hue has been confirmed. A new synthesized image is re-generated using the monotone images, and the new synthesized image is displayed in the synthesized image area 44A of the synthesized image display screen 44. For example, in the case that the user has confirmed the hue of monotone image 46A only, new monotone images are generated for monotone images 46B through 46D, and original monotone image 46A and new monotone images 46B through 46D are employed to generate a new synthesized image.

In the second embodiment, an LUT1 (Look Up Table) that lists correspondent relationships between a plurality of colors and corresponding hues, which are set in advance, is stored in the hard disk 24. FIG. 8 is a diagram that illustrates an example of the LUT1. As illustrated in FIG. 8, a plurality of colors are correlated to a plurality of hues in the LUT1. Note that each color and each hue has a margin of error of 30 for each of the R, G, and B values. The LUT1 is generated in advance by a color coordinator.

In the case that the user has confirmed the hue of at least one desired monotone image, the new monotone images are generated for the other monotone images by referring to the LUT1. Hues for the new monotone images are randomly selected from among those that correspond to the confirmed hue.

For example, in the case that the confirmed hue is (R, G, B)=(75, 12, 3), the third row in the LUT1 is referred to. Then, hues are randomly selected from the "corresponding hues" column of the third row, and the new monotone images are generated using the randomly selected hues.

On the other hand, in the case that the user has not confirmed a hue, new monotone images are re-generated for all of the monotone images 46A through 46D using randomly selected hues. Then, a new synthesized image is generated using the new monotone images and displayed in the synthesized image area 44A of the synthesized image display screen 44.

In the case that the result of judgment in step ST19 is negative, it is judged whether a completion command for the synthesized image generating process has been issued (step ST20). That is, whether the "CONFIRM" button 44D has been clicked in judged. In the case that the result of judgment in step ST20 is negative, the process returns to step ST16, and the steps thereafter are repeated. In the case that the result in step ST20 is affirmative, an image data set that represents the confirmed synthesized image is recorded in the hard disk 24 (step ST21), and the process ends.

Note that the synthesized image may be output as a print by a printer (not shown). Alternatively, the synthesized image may be recorded onto the memory card 2, and output as a print by a DPE store, to which the image data set has been transmitted via a network, or by the memory card 2 being brought into the DPE store. As a further alternative, the synthesized image generating apparatus 1 may be incorporated into a print reception terminal installed at a DPE store. In this case, the synthesized image may be directly output as a print at the DPE store.

In the second embodiment, a command that confirms the hue of at least one of the monotone images of the displayed synthesized image is received. The LUT1, in which a plurality of colors are correlated to a plurality of hues, us referred to, and new monotone images are generated for the images other than the at least one monotone image in which the hue has been confirmed. The new monotone images are generated by randomly selecting from among hues correlated to the confirmed hue of the at least one monotone image. A new synthesized image is generated, employing the monotone image in which the hue has been confirmed, and the new monotone images. Accordingly, synthesized images having color schemes with superior artistic values can be generated.

Figure 9:
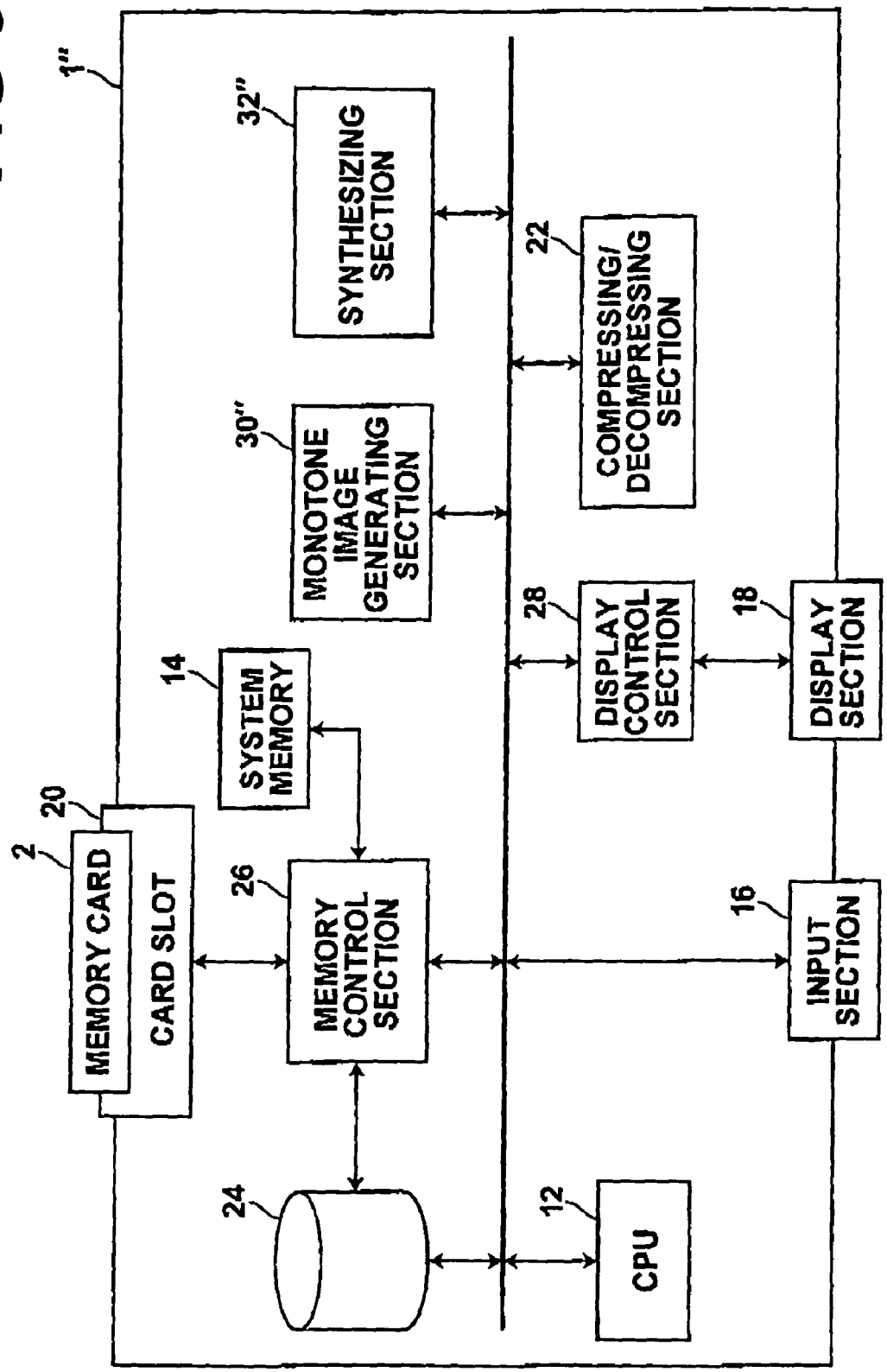
FIG. 9 is a schematic block diagram that illustrates the construction of a synthesized image generating apparatus according to a third embodiment of the present invention.

Next, a third embodiment of the present invention will be described. FIG. 9 is a schematic block diagram that illustrates the construction of a synthesized image generating apparatus 1" (hereinafter, simply referred to as "apparatus 1"") according to the third embodiment of the present invention. Note that structural components of the apparatus 1" of the third embodiment which are the same as those of the apparatus 1 of the first embodiment will be denoted with the same reference numerals, and detailed descriptions thereof will be omitted. The apparatus 1" of the third embodiment differs from the apparatus 1 of the first embodiment in that it comprises a monotone image generating section 30" and a synthesizing section 32" that perform processes different from those performed by the monotone image generating section 30 and the synthesizing section 32.

Hereinafter, the functions of the monotone image generating section 30" and the synthesizing section 32" will be described in combination with processes which are performed by the apparatus 1" of the third embodiment. Note that in the third embodiment, there are at least three images, including a background image, employed to generate the synthesized image.

Figure 10:
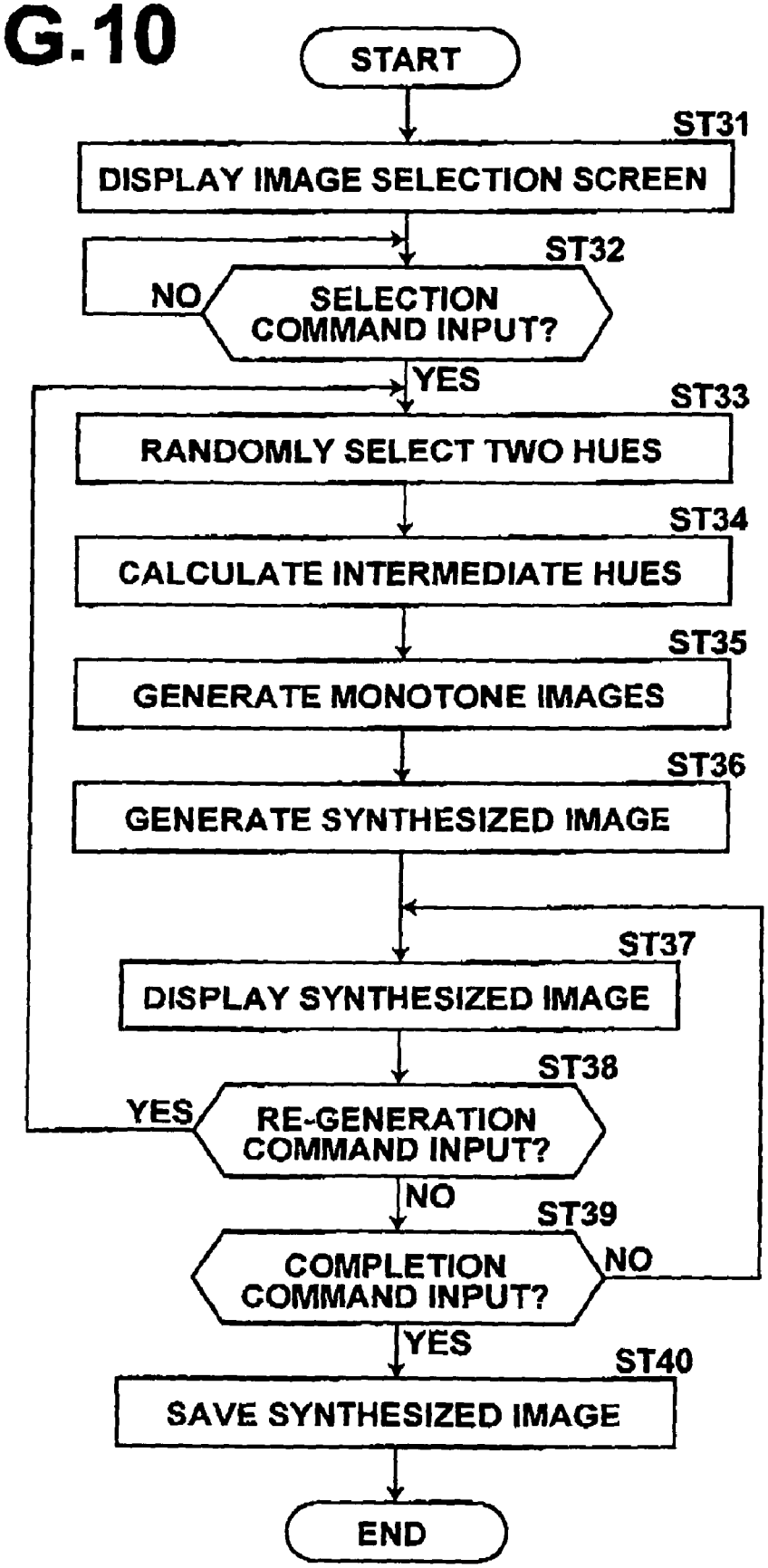
FIG. 10 is a flow chart that illustrates the process performed by the synthesized image generating apparatus of the third embodiment.

FIG. 10 is a flow chart that illustrates the process performed by the apparatus 1" of the third embodiment. The CPU 12 initiates processing when a user inputs a command to generate a synthesized image via the input section 16. First, an image selection screen, including thumbnail images of images which are stored in the hard disk 24, is displayed by the display section 18 (step ST31). Note that the image selection screen of the second embodiment is the same as that of the first embodiment illustrated in FIG. 3. Therefore, a detailed description thereof will be omitted here.

Next, monitoring is initiated to determine whether the user has clicked the "CONFIRM" button 40E to indicate that they have completed selection of images (step ST32). When the "CONFIRM" button 40E is clicked, the monotone image generating section 30" generates copies of the image selected by the users, the number of copies corresponding to the number of image insertion regions within a selected background image, and randomly selects hues for two of the images (step ST33). For example, in the case that four images have been selected, and the images have 8 bit gradations within an RGB color space, hues are randomly selected for two images as, for example, (R, G, B)=(100, 23, 248) and (2, 45, 100). Further, intermediate hues between the two randomly selected hues are calculated for the images other than the two images (step ST34).

Here, the hues selected for the two images are designated as (R, G, B)=(R1, G1, B1) and (Rn, Gn, Bn) (wherein n is the total number of images). The intermediate hues (Ri, Gi, Bi) are calculated according to formula (1) below. Thereby, the hues (Ri, Gi, Bi) for the other images become intermediate hues between the hues (R1, G1, B1) and (Rn, Gn, Bn). Therefore, when all of the images are arrange in the order i=1 to n, the hues of the images gradually change from (R1, G1, B1) to (Rn, Gn, Bn).

$$(Ri, Gi, Bi) = \left(R1 + (Rn - R1) \times \frac{i-1}{n-1}, \right. \tag{1}$$
$$\left. G1 + (Gn - G1) \times \frac{i-1}{n-1}, B1 + (Bn - B1) \times \frac{i-1}{n-1}\right)$$

Then, the monotone image generating section 30" converts each of the plurality of images (including the background image) into monotone images according to the selected and calculated hues, to generate monotone images (step ST35). At this time, it is preferable for the background image to be converted into a monotone image of one of the selected hues.

Next, the synthesizing section 32" inserts the monotone images of the images selected by the user into the monotone image of the background image and arranges the input text, to generate the synthesized image (step ST36). Then, the generated synthesized image is displayed by the display section 18 (step ST37). Note that the synthesized image display screen of the third embodiment is the same as the synthesized image display screen 42 illustrated in FIG. 4, and therefore a detailed description thereof will be omitted.

Thereafter, it is judged whether a re-generation command has been issued (step ST38). That is, whether the "RE-GENERATE" button 42C has been clicked is monitored. In the case that the judgment in step ST38 is affirmative, the process returns to step ST33, and the steps thereafter are repeated. Thereby, new monotone images are re-generated, a new synthesized image is re-generated using the new monotone images, and the new synthesized image is displayed in the synthesized image area 42A of the synthesized image display screen 42.

In the case that the result of judgment in step ST38 is negative, it is judged whether a completion command for the synthesized image generating process has been issued (step ST39). That is, whether the "CONFIRM" button 42D has been clicked in judged. In the case that the result of judgment in step ST39 is negative, the process returns to step ST37, and the steps thereafter are repeated. In the case that the result in step ST39 is affirmative, an image data set that represents the confirmed synthesized image is recorded in the hard disk 24 (step ST40), and the process ends.

Note that the synthesized image may be output as a print by a printer (not shown). Alternatively, the synthesized image may be recorded onto the memory card 2, and output as a print by a DPE store, to which the image data set has been transmitted via a network, or by the memory card 2 being brought into the DPE store. As a further alternative, the synthesized image generating apparatus 1 may be incorporated into a print reception terminal installed at a DPE store. In this case, the synthesized image may be directly output as a print at the DPE store.

In this manner, in the third embodiment, two of at least three images are converted to monotone images of randomly selected hues. Images other than the two images are converted into monotone images of intermediate hues between the two randomly selected hues. The monotone images are arranged in a predetermined layout to generate the synthesized image. Therefore, the resulting synthesized image includes two monotone images of unpredictable hues, and at least one other monotone image, in which the hue of the two images changes gradually. Accordingly, the resulting synthetic image is unpredictable, aesthetically pleasing, and high in artistic value.

In addition, the synthesized image is displayed; new monotone images can be generated based on an input re-generation command; a new synthesized image is generated by arranging the newly generated monotone images; and the new synthesized image is re-displayed. Thereby, synthesized images can be re-generated until one is obtained having a desired color scheme.

Note that in the first through third embodiments described above, the synthesized image generating apparatuses are employed as stand alone devices. Alternatively, the synthesized image generating apparatuses may be provided for use by cellular telephones with built in cameras (hereinafter, simply referred to as "camera phones") and a server, with which the camera phones communicate via the Internet. In this case, users may photograph images with their camera phones, and synthesized images may be generated by the server. Hereinafter, this configuration will be described as a fourth embodiment of the present invention.

Figure 11:
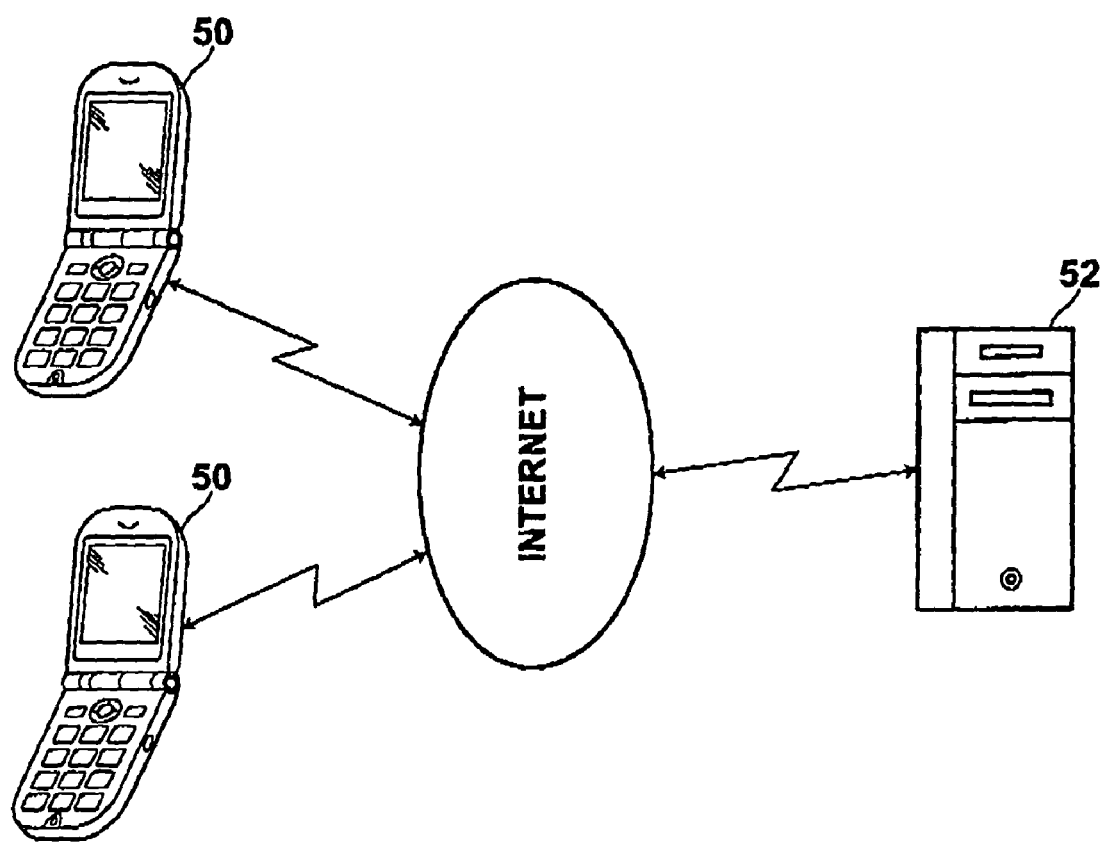
FIG. 11 is a schematic block diagram that illustrates the construction of a server system, in which a synthesized image generating apparatus according to a fourth embodiment of the present invention is incorporated.

FIG. 11 is a schematic diagram that illustrates the construction of a server system, to which the synthesized image generating apparatus of the fourth embodiment is applied. As illustrated in FIG. 11, the server system comprises: camera phones 50 and a server 52, into which the synthesized image generating apparatus of the present invention is incorporated. The camera phones 50 and the server 52 communicate via the Internet, to generate synthesized images.

Figure 12:
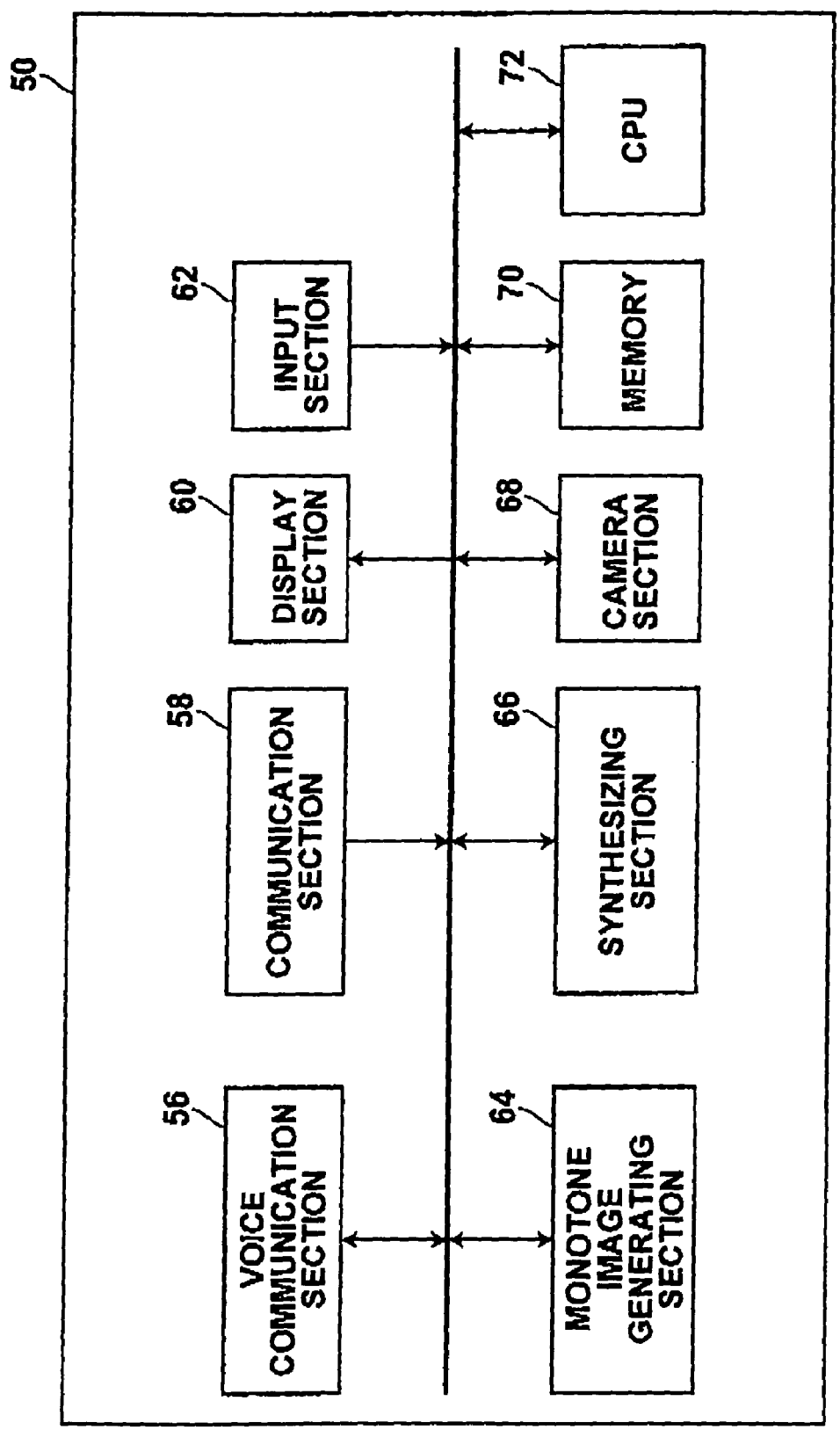
FIG. 12 is a schematic block diagram that illustrates the construction of a cellular telephone with a built in camera.

FIG. 12 is a schematic block diagram that illustrates the construction of the camera phone 50. As illustrated in FIG. 12, the camera phone 50 utilized in the fourth embodiment comprises: a voice communication section 56, for enabling voice communications; a communication section 58, for enabling communications via the Internet; a display section constituted by an LCD monitor or the like, for performing various types of display; an input section 62 constituted by ten keys or the like, for performing various types of input; a monotone image generating section 64 having the same function as the aforementioned monotone image generating section 30; a synthesizing section 66 having the same function as the aforementioned synthesizing section 32; a camera section 68, for obtaining images by photography; a memory 70, for storing various programs for operating the camera phone 50, images, and various types of data; and a CPU 72, for controlling the various components of the camera phone 50.

Note that the monotone image generating section 64 and the synthesizing section 66 may alternatively have the same functions as the monotone image generating sections 30' and 30", and the synthesizing sections 32' and 32" of the second and third embodiments.

The CPU 72 of the camera phone 50 has less processing power than CPU's installed in servers or personal computers. In addition, regarding the finish of a synthesized image, a user of the camera phone 50 needs only to confirm the color scheme of the monotone images included in the synthesized image. For these reasons, in the fourth embodiment, the monotone image generating section 64 utilizes monotone images constituted solely by the randomly selected color, without using the actual images thereof (that is, without the density differences of the original images). Accordingly, the synthesized images generated by the synthesizing section 66 are constituted only by colors.

Figure 13:
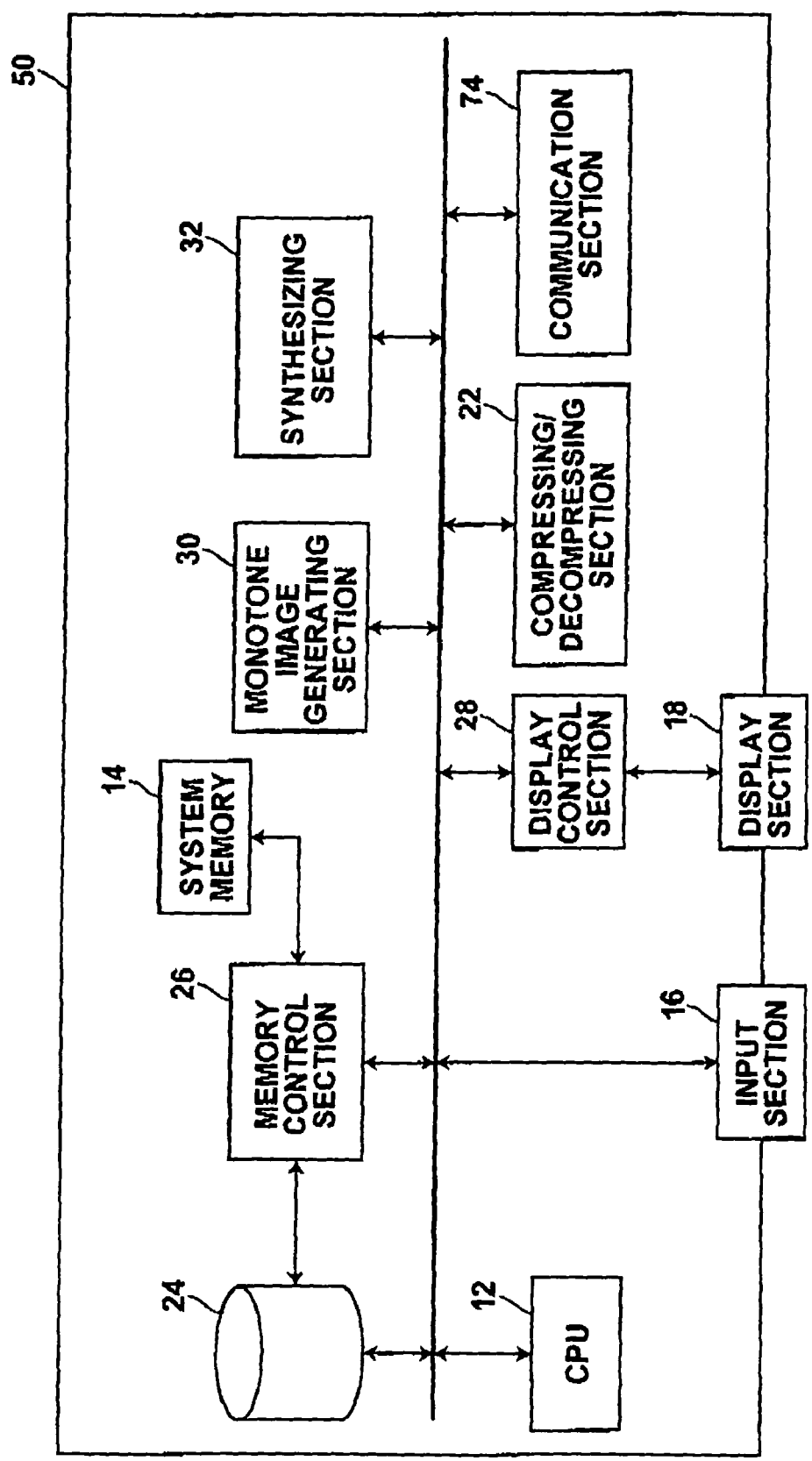
FIG. 13 is a schematic block diagram that illustrates the construction of a server.

FIG. 13 is a schematic block diagram that illustrates the construction of the server 52. Note that structural components of the server 52 which are the same as those of the apparatus 1 of the first embodiment will be denoted with the same reference numerals, and detailed descriptions thereof will be omitted. As illustrated in FIG. 13, the server 52 of the fourth embodiment differs from the apparatus 1 of the first embodiment in that the card slot 20 has been omitted, and replaced with a communications section 74, for communicating via the Internet.

Figure 14:
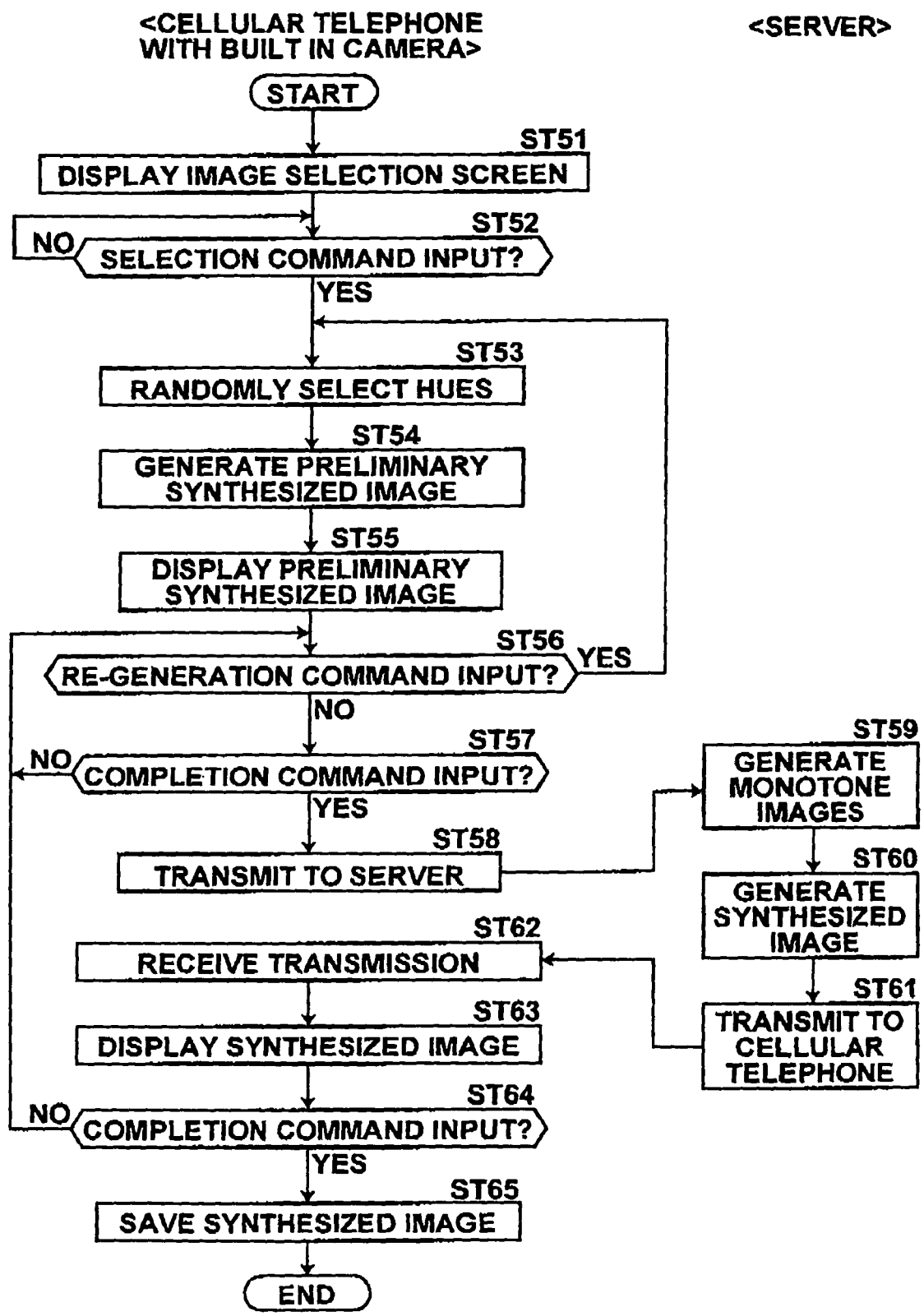
FIG. 14 is a flow chart that illustrates the process performed by the fourth embodiment.
Figure 15:
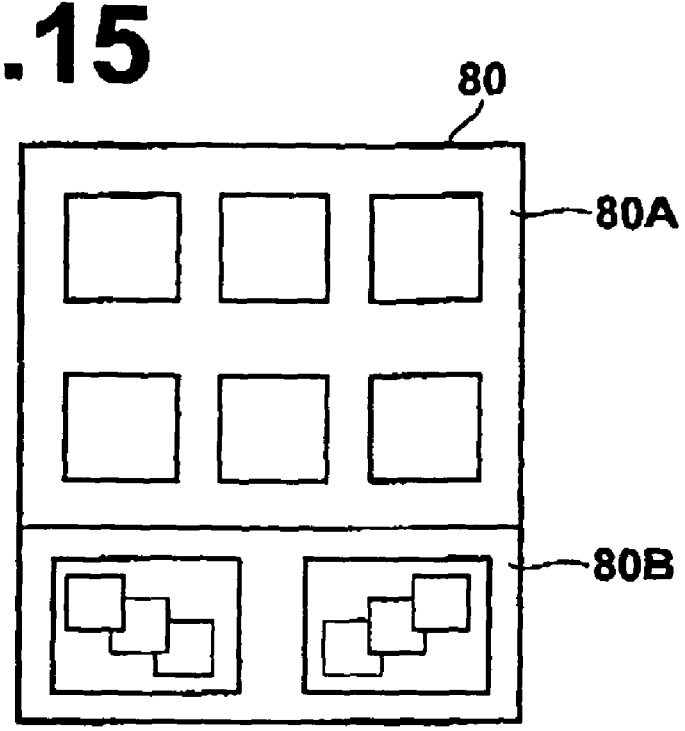
FIG. 15 is a diagram that illustrates an example of an image selection screen.

Next, the process performed by the fourth embodiment will be described. FIG. 14 is a flow chart that illustrates the process performed in the fourth embodiment. Note that here, it is assumed that image data representing images obtained by photography and background images are stored in the memory 70 of the camera phone 50. The CPU 72 initiates processing when a user inputs a command to generate a synthesized image via the input section 62. First, an image selection screen 80, including thumbnail images of images which are stored in the memory 70, are displayed by the display section 60 (step ST51). FIG. 15 illustrates an example of the image selection screen 80. As illustrated in FIG. 15, the image selection screen 80 comprises: a thumbnail image area 80A, in which thumbnail images of images stored in the memory 70 are displayed; and a background image area 80B, in which background images are displayed The user is enabled to select desired images and background images from the thumbnail image area B0A and the background image area B0B of the image selection screen, by clicking desired images within the thumbnail image area 80A and the background image area 80B. Note that here, a case will be described in which a single image is selected. The user issues selection commands by pressing a predetermined button (for example, the center button of a cruciform key) of the input section 62 while selecting an image within the thumbnail image area 80A and the background image area BOB.

Next, monitoring is initiated to determine whether the user has issued selection commands (step ST52). When the result of monitoring in step ST52 is affirmative, the monotone image generating section 64 randomly selects a number of hues, the number of hues corresponding to the number of image insertion regions within a selected background image plus one for the background image (step ST53). Thereafter, the synthesizing section 64 colors the background image and the image insertion regions thereof with the random hues selected by the monotone image generating section 64, to generate a preliminary synthesized image (step ST54). Then, the generated preliminary synthesized image is displayed by the display section 60 (step ST55).

Figure 16:
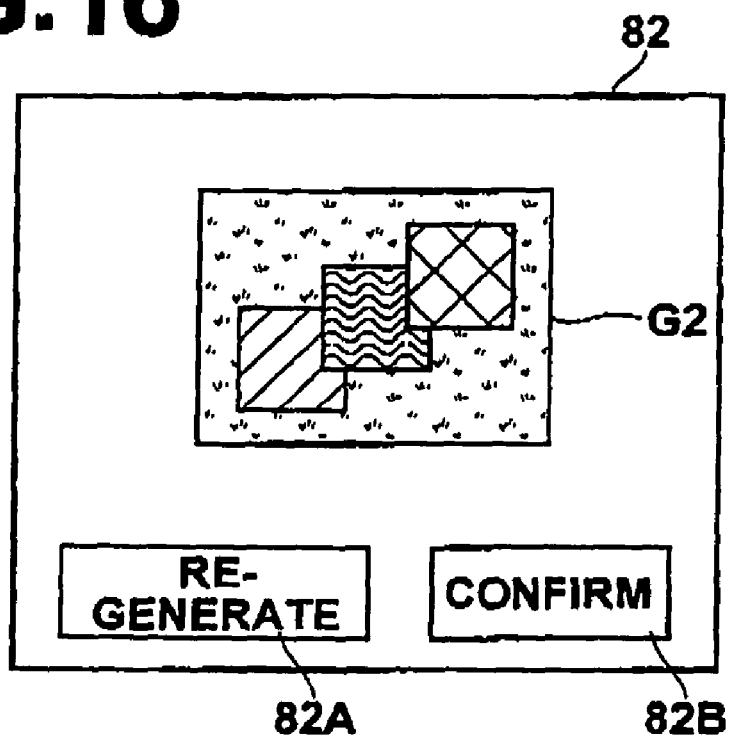
FIG. 16 is a diagram that illustrates an example of a preliminary synthesized image display screen.

FIG. 16 illustrates an example of a synthesized image display screen 82. As illustrated in FIG. 16, the synthesized image display screen 82 comprises: a preliminary synthesized image G2; a "RE-GENERATE" button 82A, for re-generating a synthesized image, and a "CONFIRM" button 82B, for confirming a displayed synthesized image. Note that in the preliminary synthesized image G2 displayed in the synthesized image display screen 82, the monotone images are represented by different types of hatching, to indicate that they are monotone images of different hues.

Thereafter, it is judged whether a re-generation command has been issued (step ST56). That is, whether the "RE-GENERATE" button 82A has been clicked is monitored. In the case that the judgment in step ST56 is affirmative, the process returns to step ST53, and the steps thereafter are repeated. Thereby, new hues are randomly selected, a new preliminary synthesized image is generated using the newly selected hues, and the new preliminary synthesized image is displayed in the synthesized image display screen 82.

In the case that the result of judgment in step ST56 is negative, it is judged whether a completion command for the synthesized image generating process has been issued (step ST57). That is, whether the "CONFIRM" button 82B has been clicked in judged. In the case that the result of judgment in step ST57 is negative, the process returns to step ST56, and the steps thereafter are repeated. In the case that the result in step ST57 is affirmative, hue data representing the plurality of hues included in the preliminary synthesized image G2 and the selected images are transmitted to the server 52 (step ST58). Note that the hue data includes the hues (RGB values) of each of the images to be included in the synthesized image (including the background image), and data that represents the arrangement positions of each of the images.

The monotone image generating section 30 of the server 52 generates monotone images based on the images and hue data transmitted thereto from the camera phone 50 (step ST59). Then, the synthesizing section 32 generates a synthesized image (step ST60). Thereafter, the generated synthesized image is transmitted to the camera phone 50 (step ST61).

The camera phone 50 receives transmission of the synthesized image (step ST62), and displays it at the display section 60 (step ST63). Note that at this time, the preliminary synthesized image G2 is replaced by the transmitted synthesized image in the synthesized image display screen 82. Then, it is judged whether a completion command for the synthesized image generating process has been issued (step ST64). That is, whether the "CONFIRM" button 82B has been clicked in judged. In the case that the result of judgment in step ST64 is negative, the process returns to step ST56, and the steps thereafter are repeated. In the case that the result in step ST64 is affirmative, an image data set that represents the confirmed synthesized image is recorded in the memory 70 (step ST9), and the process ends.

Note that in the fourth embodiment, text can also be included in the synthesized image, in a manner similar to that of the first through third embodiments. In this case, a text input screen may be displayed after selection of the images and the background image in the image selection screen 80, and the user may be prompted to input text.

In the fourth embodiment described above, the synthesizing section 66 of the camera phone 50 generates the preliminary synthesized image G2 without utilizing the actual images. Alternatively, monotone images utilizing the actual images may be generated by the monotone image generating section 64, and a synthesized image that utilizes the actual images may be generated by the synthesizing section 64. In this case, the synthesized image may be generated without communicating with the server 52.

In the first and fourth embodiments described above, cases have been described in which monotone images are generated from a single image. However, a number of different images corresponding to the number of image insertion regions of background images may be selected, and monotone images of the different images may be generated. In this case, synthesized images may be generated using the different monotone images.

Synthesized image generating apparatuses according to various embodiments of the present invention have been described above. Programs that cause a computer to function as the monotone image generating sections 30, 30', 30", and 64 and the synthesizing sections 32, 32', 32", and 66 and to execute the processes illustrated in FIGS. 2, 6, 10, and 14 are also embodiments of the present invention. In addition, computer readable media having such programs recorded therein are also embodiments of the present invention.

What is claimed is:

1. A synthesized image generating apparatus for generating a synthesized image by arranging a plurality of images including a background image in a predetermined layout, comprising:

monotone image generating means for generating a plurality of monotone images in which the density differences of the images are expressed by a single hue, by randomly selecting hues, the number of hues corresponding to the number of the plurality of monotone images, and by converting the plurality of images into monotone images according to the randomly selected hues; and synthesizing means for arranging the plurality of monotone images in the predetermined layout, to generate the synthesized image.

2. A synthesized image generating apparatus as defined in claim 1, further comprising:

display means for displaying the synthesized image;
input means for receiving various types of input; and
control means for controlling the monotone image generating means and the synthesizing means to:
re-generate the monotone images based on a command input to the input means;
re-generate a synthesized image by arranging the re-generated monotone images; and
re-display the synthesized image at the display means.

3. A synthesized image generating apparatus as defined in claim 1, further comprising:

color correspondence memory means for recording correspondent relationships between a plurality of colors and corresponding hues, which are set in advance;

display means for displaying the synthesized image;

input means for receiving various types of input; and control means for controlling the monotone image generating means and the synthesizing means to:

receive a command input to the input means that confirms the hue in at least one of the images included in the synthesized image;

generate new monotone images of the images except the at least one image by converting the images into monotone images of random hues using only the hues corresponding to the confirmed colors; and re-generate the synthesized image by arranging the new monotone images in the predetermined layout along with the at least one monotone image in which the hue was confirmed.

4. A synthesized image generating apparatus as defined in claim 3, wherein:

the control means controls the monotone image generating means and the synthesizing means to:

re-generate the monotone images based on a command input to the input means;

re-generate a synthesized image by arranging the re-generated monotone images; and re-display the synthesized image at the display means.

5. A synthesized image generating apparatus as defined in claim 1, wherein:

the synthesizing means generates the synthesized image such that the synthesized image includes specified text.

6. A synthesized image generating apparatus for generating a synthesized image by arranging at least three images including a background image in a predetermined layout, comprising:

monotone image generating means for generating a plurality of monotone images in which the density differences of the images are expressed by a single hue, by randomly selecting two hues, by converting two of the at least three images into monotone images according to the randomly selected hues, and by converting the other images into monotone images of intermediate hues between the two random hues; and synthesizing means for arranging the plurality of monotone images in the predetermined layout, to generate the synthesized image.

7. A synthesized image generating apparatus as defined in claim 6, further comprising:

display means for displaying the synthesized image;

input means for receiving various types of input; and control means for controlling the monotone image generating means and the synthesizing means to: re-generate the monotone images based on a command input to the input means; re-generate a synthesized image by arranging the re-generated monotone images; and re-display the synthesized image at the display means.

8. A synthesized image generating apparatus as defined in claim 6, wherein:

the synthesizing means generates the synthesized image such that the synthesized image includes specified text.

9. A synthesized image generating method for generating a synthesized image by arranging a plurality of images including a background image in a predetermined layout, comprising the steps of:

generating a plurality of monotone images in which the density differences of the images are expressed by a single hue, by randomly selecting hues, the number of hues corresponding to the number of the plurality of monotone images, and by converting the plurality of images into monotone images according to the randomly selected hues; and arranging the plurality of monotone images in the predetermined layout, to generate the synthesized image.

10. A synthesized image generating method as defined in claim 9, further comprising the steps of:

displaying the synthesized image;

receiving a command that confirms the hue in at least one of the images included in the displayed synthesized image;

generating new monotone images of the images except the at least one image by converting the images into monotone images of random hues using only hues corresponding to the confirmed colors, said correspondence between a plurality of colors and corresponding hues being set in advance; and re-generating the synthesized image by arranging the new monotone images in the predetermined layout along with the at least one monotone image in which the hue was confirmed.

11. A synthesized image generating method for generating a synthesized image by arranging at least three images including a background image in a predetermined layout, comprising the steps of:

generating a plurality of monotone images in which the density differences of the images are expressed by a single hue, by randomly selecting two hues, by converting two of the at least three images into monotone images according to the randomly selected hues, and by converting the other images into monotone images of intermediate hues between the two random hues; and arranging the plurality of monotone images in the predetermined layout, to generate the synthesized image.

12. A non-transitory computer readable medium having recorded therein a program that causes a computer to execute a synthesized image generating method for generating a synthesized image by arranging a plurality of images including a background image in a predetermined layout, comprising the procedures of:

generating a plurality of monotone images in which the density differences of the images are expressed by a single hue, by randomly selecting hues, the number of hues corresponding to the number of the plurality of monotone images, and by converting the plurality of images into monotone images according to the randomly selected hues; and arranging the plurality of monotone images in the predetermined layout, to generate the synthesized image.

13. A non-transitory computer readable medium having recorded therein a program that causes a computer to execute a synthesized image generating method as defined in claim 9, further comprising the procedures of:

displaying the synthesized image;

receiving a command that confirms the hue in at least one of the images included in the displayed synthesized image;

generating new monotone images of the images except the at least one image by converting the images into monotone images of random hues using only hues corresponding to the confirmed colors, said correspondence between a plurality of colors and corresponding hues being set in advance; and re-generating the synthesized image by arranging the new monotone images in the predetermined layout along with the at least one monotone image in which the hue was confirmed.

14. A non-transitory computer readable medium having recorded therein a program that causes a computer to execute a synthesized image generating method for generating a synthesized image by arranging at least three images including a background image in a predetermined layout, comprising the steps of:

generating a plurality of monotone images in which the density differences of the images are expressed by a single hue, by randomly selecting two hues, by converting two of the at least three images into monotone images according to the randomly selected hues, and by converting the other images into monotone images of intermediate hues between the two random hues; and arranging the plurality of monotone images in the predetermined layout, to generate the synthesized image.

* * * * *